US012772094B2

(12) United States Patent
Masri et al.

(10) Patent No.: US 12,772,094 B2
(45) Date of Patent: Oct. 20, 2026

(54) CORRELATION-BASED MEASUREMENT REPORTING REDUCTION

(71) Applicant: Nokia Technologies Oy, Espoo (FI)

(72) Inventors: Ahmad Masri, Tampere (FI); Afef Feki, Massy (FR); István Zsolt Kovács, Aalborg (DK); Sakira Hassan, Espoo (FI); Mahmood Reza Alizadeh Ashrafi, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 286 days.

(21) Appl. No.: 18/599,574

(22) Filed: Mar. 8, 2024

(65) Prior Publication Data

US 2024/0306026 A1 Sep. 12, 2024

(30) Foreign Application Priority Data

Mar. 10, 2023 (FI) ..................................... 20235287

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
CPC .... H04W 24/10; H04W 24/08; H04B 7/0617; H04B 7/0408; H04B 7/0695; H04B 7/0696; H04B 7/088; H04L 5/001; H04L 5/0023; H04L 5/006; H04L 5/0082; H04L 5/0048
See application file for complete search history.

(56) References Cited

U.S. PATENT DOCUMENTS

| | | | | |
|---|---|---|---|---|
| 2019/0327629 | A1* | 10/2019 | Zhang | H04B 7/0645 |
| 2020/0059898 | A1* | 2/2020 | Osawa | H04B 7/0404 |
| 2020/0068421 | A1* | 2/2020 | Luo | H04B 7/06952 |
| 2020/0336196 | A1* | 10/2020 | Ku | H04B 17/24 |
| 2021/0195572 | A1* | 6/2021 | Guan | H04B 7/063 |
| 2021/0234604 | A1* | 7/2021 | Raghavan | H04L 5/0023 |
| 2021/0297129 | A1* | 9/2021 | Da Silva | H04B 7/0617 |

* cited by examiner

*Primary Examiner* — Rushil P. Sampat
(74) *Attorney, Agent, or Firm* — Carter, DeLuca & Farrell LLP

(57) ABSTRACT

According to an aspect, there is provided an apparatus for performing the following. The apparatus performs cell-specific radio measurements for a plurality of cells or beam-specific radio measurements for a plurality of transmit beams. The apparatus evaluates correlation between results of the cell/beam-specific radio measurements and compares the correlation against one or more pre-defined correlation conditions. In response to the correlation for at least one pair of cells in the plurality of cells or for at least one pair of transmit beams in the plurality of transmit beams satisfying the one or more pre-defined correlation conditions, the apparatus filters the results of the cell-specific or beam-specific radio measurements to remove repetitions of results satisfying the one or more pre-defined correlation conditions and transmits, to another apparatus, a measurement report including the filtered results and information on the correlation.

14 Claims, 8 Drawing Sheets

CORRELATION-BASED MEASUREMENT REPORTING REDUCTION

TECHNICAL FIELD

Various example embodiments relate to wireless communications.

BACKGROUND

Fifth Generation (5G) New Radio (NR) Release 18 aims to enable the so-called layer 1/layer 2 (L1/2) intercell mobility, also known as Layer 1 Triggered Mobility (LTM). In practice, this means that the control of mobility would be moved from the central unit (CU) of the access node to the distributed unit(s) (DU(s)) of the access node. Thus, the handover could be activated, e.g., via the medium access control (MAC) layer, as opposed to, e.g., the radio resource control (RRC) layer. However, LTM has the disadvantage of requiring significant amount of measurement reporting due to the need to carry out periodic L1 measurements. The needed L1 beam reporting serves to increase the signaling overhead at the system as well as the terminal device power consumption.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

Figure 1:
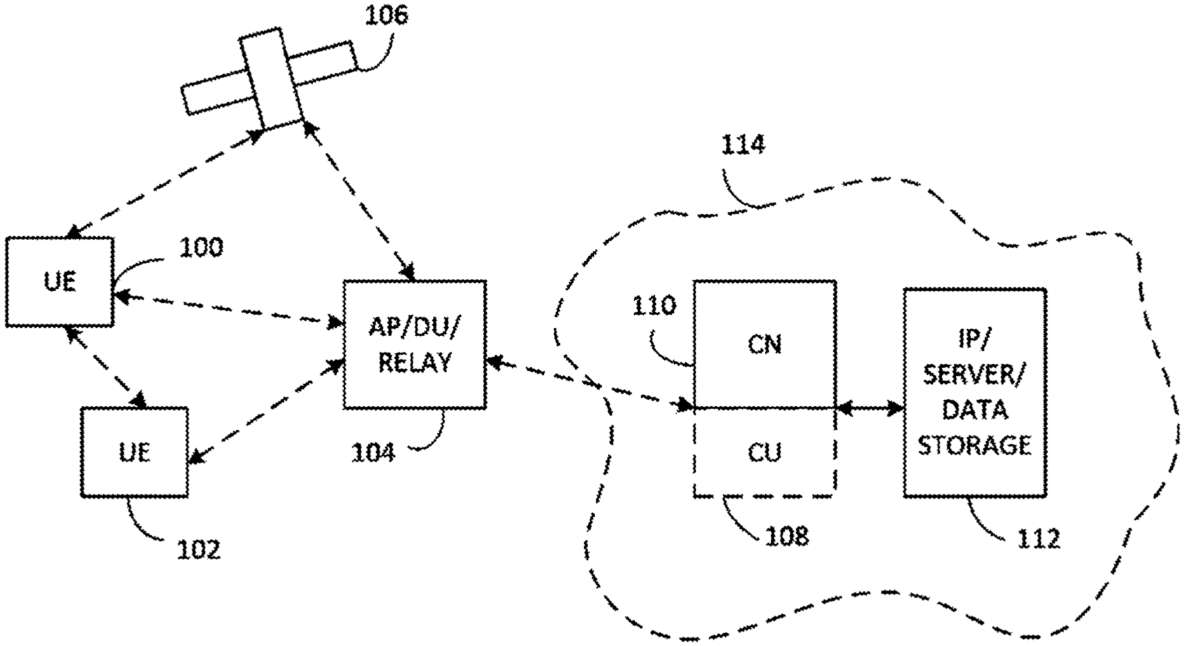
FIG. 1 illustrates an exemplified wireless communication system.

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used herein, "at least one of the following: <a list of two or more elements>" and "at least one of <a list of two or more elements>" and similar wording, where the list of two or more elements are joined by "and", "or" or "and/or", mean at least any one of the elements, or at least any two or more of the elements, or at least all the elements.

The terms "layer 1", "layer 2" and "layer 3" (abbreviated as L1, L2 and L3) as used in this application refer to layers of an Open Systems Interconnection (OSI) model. In the OSI model, layer 1 corresponds to a physical layer, layer 2 corresponds to a data link layer and layer 3 correspond to a network layer. The term "L1/2" as used in the following (e.g., in "L1/2 mobility" or "L1/2-based handover") may imply operation on layer 1 or on layer 2 or on layers 1 & 2.

The term "cell" as used in this application may be defined as a geographical area where radio coverage is provided to terminal devices by a single access node (or equally a single base station) in a cellular network. Conversely, a single access node may serve, using one or more radio transmitters or transceivers, one or more cells. An access node as mentioned in this paragraph may be a distributed access node or a non-distributed access node.

The term "correlation" as used in this application may be defined as any statistical relationship, whether causal or not, between two random variables or bivariate data. Thus, in the broadest sense, "correlation" may indicate any type of association. In some but not all embodiments, the term "correlation" may refer to the degree to which a pair of variables are linearly related. Correlation may be equally called dependence or similarity.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the substantially same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cm Wave, below 6 GHz-cmWave-mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a central or centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Sixth Generation (6G) networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

The (access node) functions may be split between the CU 108 and the DU 104 of the system of FIG. 1 in several different ways. For example, the CU 108 may host radio resource control (RRC) and packet data convergence protocol (PDCP) layers for control plane and service data application protocol (SDAP) and PDCP layers for user plane and the DU 104 may host the radio link control (RLC) and MAC layers and layer-1/physical layer (L1/PHY). In other systems (e.g., future 6G systems), the RLC may be split between the CU 108 and DU 104.

The system of FIG. 1 may be a (5G NR or 6G) communication system configured to support L1/L2 mobility (or more specifically at least L1/L2 inter-cell mobility) and/or layer 3 (L3) mobility.

In L1/L2 mobility, the control of mobility is moved from the CU to the DU and therefore may be activated, e.g., via the MAC layer or PHY layer. There are two modes for DU-based mobility: 1) intra-DU mobility (i.e., mobility between cells within the same DU) and 2) inter-DU mobility (i.e. mobility between cells within the same CU but different DUs). For intra-DU mobility, DU has all the information needed to decide on the serving cell change. At least some of the embodiments to be discussed below are targeting specifically the inter-DU mobility and overcoming certain problems associated with it (to be discussed below).

In contrast to layer 3 (L3) mobility procedures where the handover between two cells is decided by the RRC layer, the L1/2 inter-cell mobility may be performed (predominantly) by the MAC layer terminated in the DU.

The main steps of an exemplary execution of L1/L2 inter-cell mobility between an (initial) serving cell provided by a first distributed unit (DU1) and a target cell provided by a second distributed units (DU2) of an access node (gNB) are summarized in the following:

1) Initially, a terminal device (UE) sends measurement report containing the cell quality measurements of serving and neighboring cells via the DU1 to a central unit (CU) of the access node. The terminal device may be configured by the serving cell (i.e., by the DU1) to send the measurement report early when it still has a good connection to the serving cell (i.e., to the DU1).

2) Using the reported cell quality measurements, the CU is able to identify a potential set of candidate target cells to which the terminal device can be handed over. In this example, the CU identifies candidate target cells that are served by the DU1 (controlling the serving DU/cell as well) and another DU2 that is controlled by the same CU.
3) The CU requests the preparation of a candidate target cell controlled by DU1 by sending UE context setup request message to the DU1.
4) In response to receiving the UE context setup request, the DU1 transmits information on a configuration of the terminal device in a UE context setup response message containing a container to the CU.
5) The steps 3)-4) are performed in a similar manner between the CU and the DU2 in order to prepare target cell(s) that are controlled by DU2.
6) Having received the terminal device's configurations for the candidate target cell(s), the CU generates an RRC Reconfiguration that is sent from the CU to the terminal device (via the DU1). The RRC Reconfiguration message may comprise at least measurement reporting configuration for L1/2 handover, i.e., configuration on how to report the L1 beam measurements of serving and target cells and configuration of the prepared candidate cell(s) which the terminal device needs to execute when it receives a MAC CE command to change the serving cell (perform handover).
7) The terminal device receives/obtains the RRC reconfiguration message and transmits an RRC reconfiguration complete message back to the CU (via the DU1).
8) The terminal device starts to report periodically the L1 beam measurement of serving and candidate target cells.
9) Upon determining that there is a target candidate cell having a better radio link/beam measurement than the serving cell, e.g., L1-reference signal received power (RSRP) of target beam measurement is larger than L1-RSRP of serving beam measurement summed with an offset for an amount of time e.g., time-to-trigger (TTT), the DU1 sends a MAC CE or a L1 message to the terminal device for triggering the cell change to the target candidate cell.
10) Finally, the terminal device may perform handover from the serving cell to the target cell.

One of the main benefits of L1 inter-cell mobility compared to baseline handover and conditional handover is that the interruption during the handover execution can be reduced substantially as the terminal device does not need to perform higher layer (RRC, PDCP) reconfiguration and for some scenarios terminal device can perform RACHless to connect to the target cell.

As mentioned above, in L3 mobility procedures, the handover between two cells is decided by the RRC layer (i.e., predominantly by the CU).

At least in some embodiments, artificial intelligence/machine learning (AI/ML) air interface in RAN1 may be employed. The AI/ML air interface may be employed here for CSI feedback enhancement, e.g., overhead reduction, improved accuracy and/or prediction.

Measurement reporting overhead in modern communications systems, e.g., as described in connection with FIG. 1 consumes typically significant amount of radio resources as well as inducing terminal device energy consumption. This problem becomes especially severe in L1/L2 triggered mobility (LTM) as periodic L1 measurements have to be carried out. Namely, L1 beam reporting increases the signaling overhead at the system as well as terminal device power consumption.

The embodiments seek to overcome or at least alleviate the aforementioned problems relating to measurement reporting overhead by reducing the amount of measurement reporting based on calculated correlation between different measurements. The basic idea is that if there are two measurement results with sufficient high correlation, it is unnecessary to report both of them to the network. In other words, it is sufficient in such a case to report only the first of the two measurement results as the second one result would not provide significant additional information to network. Moreover, the second measurement result or its statistical characteristics could, in any way, be retrievable based on the first measurement result and the correlation information at the receiver side, if required.

Figure 2:
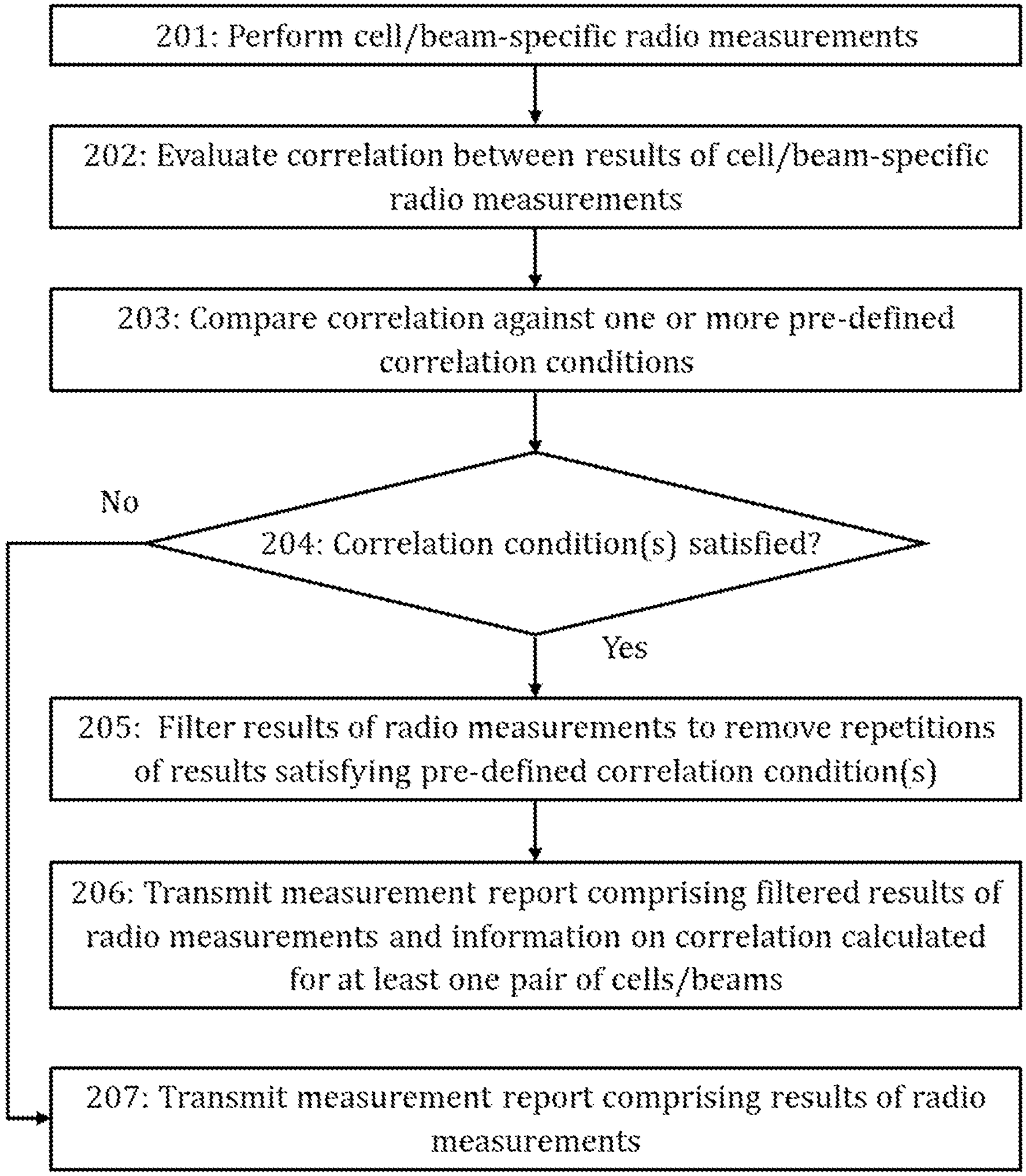
FIG. 2 illustrates an exemplary process according to embodiments.

FIG. 2 illustrate a process according to an embodiment for reporting measurement results in a manner which aims to reduce measurement reporting overhead. The process of FIG. 2 may be applicable to the correlation-based L3 measurement cell-level reporting use case (discussed in further detail in connection with FIGS. 3 to 5) and the L1/2 intercell mobility use case (discussed in further detail in connection with FIG. 6). The illustrated process is performed by an apparatus which may be a terminal device or a part (e.g., a computing device) thereof. Said terminal device may correspond to either of the terminal devices 100, 102 of FIG. 1.

Referring to FIG. 2, the apparatus performs, in block 201, cell-specific radio measurements for a plurality of cells or beam-specific radio measurements for a plurality of transmit beams. The plurality of transmit beams may be associated (altogether) with one or more cells. In other words, the apparatus measures, in block 201, radio signals transmitted by one or more access nodes (or one or more distributed units of one or more distributed access nodes) associated with the plurality of cells or the one or more cells (in the beam-specific alternative). Here, the measured radio signals may be, in particular, reference radio signals. The radio measurements may be L1/2 measurements (in the beam-specific or beam-level case) or L3 measurements (in the cell-specific or cell-level case). The results of the radio measurements may comprise, for each of the plurality of cells/transmit beams, for example, one or more (cell-specific or beam-specific) values of reference signal received power (RSRP), reference signal received quality (RSRQ) and/or channel state information (CSI).

It should be noted that, in general, the plurality of (measured) cells as discussed in connection with any of the embodiments comprise one or more cells served by the serving access node or by one or more distributed units of the serving access node and/or one or more cells served by one or more neighboring access nodes (that is, neighboring relative to the serving access node) or by one or more distributed units of the one or more neighboring access node. Similarly, the plurality of (measured) beams as discussed in connection with any of the embodiments comprise, in particular, transmit beams of the serving access node or transmit beams of one or more distributed units of the serving access node and/or transmit beams of one or more neighboring access nodes (that is, neighboring relative to the serving access node) or transmit beams of one or more distributed units of the one or more neighboring access node.

The apparatus evaluates, in block 202, correlation between results of the cell-specific or beam-specific radio measurements (i.e., correlation between cells or between transmit beams from the point of view of the apparatus). The former option may be applicable especially when block 201 corresponds to L3 measurements while the latter option may apply especially when block 201 corresponds to L1/2 measurements.

As mentioned above, the evaluation of the correlation in block 202 is performed in a cell-specific manner (based on L3 measurements) or in a beam-specific manner (based on L1/2 measurements). Namely, the evaluation of the correlation in block 202 may specifically comprise calculating values of a correlation metric between the results of the cell-specific or beam-specific radio measurements. In other words, the evaluation of the correlation in block 202 may comprise calculating values of the correlation metric between different cell-specific results of radio measurements (e.g., between an RSRP for cell 1 and an RSRP for cell 2) or between different beam-specific results of radio measurements (e.g., between a CSI for beam 1 associated with cell 1 and a CSI for beam 2 associated with cell 1 or 2).

The correlation metric as mentioned above may be or be based on at least one of: Pearson sample correlation coefficient, a Spearman's rank correlation coefficient, a Mann Whitney U test, a Wilcoxon test, a Kruskal-Wallis test, a Friedman test, a Dice's coefficient, a Tanimoto Distance, a Jaccard Index or a Kuncheva Index. The correlation metric may be ranking based (e.g., Spearman's rank correlation coefficient, Mann Whitney U test, Wilcoxon test, Kruskal Wallis, Friedman test), weight based (e.g., Pearson sample correlation coefficient) and/or indexing based (e.g., Dice's coefficient, Tanimoto Distance, Jaccard Index or Kuncheva Index).

In some embodiments, the correlation metric may be the Pearson sample correlation coefficient r or its absolute value. The Pearson sample correlation coefficient r may be defined according to the following equation:

$$r = \frac{\sum (x_i - \bar{x})(y_i - \bar{y})}{\sqrt{\sum (x_i - \bar{x})^2 \sum (y_i - \bar{y})^2}}, \quad (1)$$

where r is the correlation coefficient, $x_i$ are values of the x-variable in a sample, $\bar{x}$ is the mean of the values of the x-variable, $y_i$ are values of the y-variable in a sample and $\bar{y}$ is the mean of the values of the y-variable. Moreover, the sums in the above equation are calculated over index i. Here, the x- and y-variables are variables of the same type defined for two different cells or two different transmit beams. For example, the x- and y-variables may be, e.g., RSRP, RSRQ or CSI measured for two cells of the plurality of (measured) cells or for two transmit beams of the plurality of (measured) beams.

According to a general definition, the Pearson sample correlation coefficient is a test statistic that measures the statistical linear relationship, or association, between two continuous variables. It is known as the optimal method for measuring the association between variables of interest due to it being based on the method of covariance. The Pearson sample correlation coefficient gives information about the magnitude of the association, or correlation, as well as the direction of the relationship. Pearson sample correlation coefficient r has a value between +1 and −1, where 1 indicates total positive linear correlation, 0 indicates no linear correlation, and −1 indicates total negative linear correlation.

The Pearson sample correlation coefficient r may also be written in the following alternative form:

$$r = \frac{n\sum (x_i y_i) - \left(\sum x_i\right)\left(\sum y_i\right)}{\sqrt{\left[n\sum x_i^2 \sum (x_i)^2\right]\left[n\sum y_i^2 \sum (y_i)^2\right]}}, \quad (2)$$

where n is the total number of pairs of cells or transmit beams.

While in some embodiments the evaluation of the correlation in block 202 may be performed analytically, in other embodiments, the evaluation of the correction in block 202 may be performed with the help of a machine-learning-based method. For this purpose, in such embodiments, the apparatus may maintain, in at least one memory, a trained machine-learning algorithm (or model) for evaluating correlation between different cell-specific results of radio measurements. Here, the results of radio measurements associated with two different cells or two different transmit beams may be the features of the (trained) machine-learning algorithm while the correlation value(s) (or value(s) of a correlation metric) may be labels of the (trained) machine-learning algorithm. The trained machine-learning model may have been trained previously by a DU or a CU based on training data collected from the network and communicated to the apparatus (i.e., to the associated terminal device). The (trained) machine-learning algorithm may be based, e.g., on one or more artificial neural networks (ANNs) of one or more different types (e.g., one or more convolutional neural networks), deep reinforcement learning (RL), long short-term memory (LSTM) and/or multi agent (reinforcement) learning.

The apparatus compares, in block 203, the (inter-cell or inter-beam) correlation (e.g., the values of the correlation metric) against one or more pre-defined correlation conditions. In some embodiments, the one or more pre-defined correlation conditions may be defined to be cell-pair specific or beam-pair specific (i.e., different correlation condition(s) may be applied for different combinations of cells or transmit beams). The one or more pre-defined correlation conditions may have been configured to the apparatus previously by the serving access node (or by the serving distributed unit), as will be described in more detail in connection with FIGS. 3 to 6.

The one or more pre-defined correlation conditions may comprise or consist of a pre-defined threshold for the correlation (e.g., for a value of the correlation metric). If the correlation (e.g., the value of the correlation metric) exceeds or is equal to the pre-defined threshold, the one or more pre-defined correlation conditions may be considered satisfied.

In some embodiments, the pre-defined correlation threshold may be defined to be cell-pair-specific or beam-pair-specific (i.e., it may have a different value for different pairs of cells or for different pairs of transmit beams).

Alternatively, the one or more pre-defined correlation conditions may comprise or consist of a plurality of pre-defined correlation conditions associated with different levels of required correlation. Said plurality of pre-defined correlation conditions may comprise, e.g., a first pre-defined threshold and a second pre-defined threshold. Depending on how the correlation (e.g., the value of the correlation metric) aligns with respect to the plurality of pre-defined correlation conditions, different reporting functionalities may be implemented, as will be described below in detail in connection with FIGS. 3 to 6.

In some embodiments, the first and second pre-defined thresholds may be defined to be cell-pair-specific or beam-pair-specific (i.e., they may have different values for different pairs of cells or for different pairs of transmit beams).

The one or more pre-defined correlation conditions may have been defined or set up specifically for a certain use case (e.g., beam prediction, CSI compression or L1 triggered mobility). The one or more pre-defined correlation conditions may have been defined, by the serving access node, e.g., based on earlier measurement reports transmitted by the terminal device, as described in detail in connection with FIGS. 3, 4 and 5.

In response to the correlation for at least one pair of cells in the plurality of cells or for at least one pair of transmit beams in the plurality of transmit beams satisfying the one or more pre-defined correlation conditions in block 204, the apparatus, first, filters (or adapts or modifies), in block 205, the results of the cell-specific or beam-specific radio measurements at least to remove (redundant) repetitions of results satisfying the one or more pre-defined correlation conditions (i.e., repetitions of similar or correlated results). In other words, if there are two measurement results which relate to respective two cells or transmit beams and satisfy together the one or more pre-defined correlation conditions, the apparatus may remove one of said measurement results while leaving the other untouched. Here, the measurement result which is not removed may be, for example, the one having the highest measured value (e.g., highest RSRP value) of the two similar measurement results, or it may be randomly selected.

Following the filtering in block 205, the apparatus transmits, in block 206, to an access node, a measurement report comprising the filtered results of the radio measurements and information on the correlation calculated for the at least one (correlated) pair of cells in the plurality of cells or for the at least one (correlated) pair of transmit beams in the plurality of transmit beams. The measurement report may be an L1 (or L1/2) measurement report or an L3 measurement report. Here, for each (correlated) pair of cells/transmit beams, measurement results of one of the cells/transmit beams in the pair is assumed to be included in the transmitted filtered results while the measurement results for the other cell/transmit beam in the pair is assumed to have been filtered out. The information on the correlation calculated for at least one pair of cells/transmit beams serves to indicate that a certain missing measurement result associated with a given cell/transmit beam is strongly correlated with one of the included measurement results relating to some other cell/transmit beam and optionally also to quantify how strong the correlation is. The information on the correlation calculated for the at least one pair of cells or transmit beams may comprise, for each pair of cells or transmit beams, identification information identifying the pair of (correlated) cells or transmit beams. The information on the correlation calculated for the at least one pair of cells/transmit beams may also comprise, for each pair of cells/transmit beams, a value of the correlation metric (quantifying correlation between measurement results calculated for the pair of cells/beams). Results of any second radio measurement or its statistical characteristics may be retrievable based on the results of a first radio measurement correlated with the second radio measurement at the receiver side (if necessary).

In response to the correlation for all pairs of cells in the plurality of cells or for all pairs of measured transmit beams failing to satisfy the one or more pre-defined correlation conditions in block 204, the apparatus transmits, in block 207, a measurement report comprising the results of the cell-specific or beam-specific radio measurements (without filtering) to the access node. In other words, the results of the cell-specific or beam-specific radio measurements may be transmitted in full in this case.

In some embodiments, the apparatus may also transmit, in block 207, as a part of the measurement report, information on the correlation calculated for all (or some of) pairs of cells/transmit beams of the plurality of cells to the access node.

The transmission in block 206 and/or block 207 may be directed to a distributed unit of a distributed access node or via the distributed unit to the central unit of the distributed access node, depending on the embodiment (namely, depending on whether the transmission corresponds to an L1 or L1/2 measurement report or to an L3 measurement report). Thus, an apparatus being, e.g., the (serving) distributed unit or the (serving) central unit may receive the transmission of block 206 and/or 207.

In some embodiments, the transmission in block 206 and/or 207 may be carried out via one or more apparatuses, e.g., via at least one relay (or other) node or other node and/or via at least one terminal device.

In some alternative embodiments, the transmission in block 206 and/or 207 may be directed to a node or an apparatus other than the access node (or the distributed or central unit of the distributed access node). For example, the measurement report may be transmitted to another terminal device (as a sidelink communication).

Following the execution of the process of blocks 201 to 206 of FIG. 2, the access node (or CU or DU thereof) may receive, from the terminal device, a measurement report comprising filtered results of cell-specific or beam-specific radio measurements carried out by the terminal device for a plurality of cells or for a plurality of transmit beams, respectively, and information on a correlation between cell-specific radio measurements carried out for at least two of the plurality of cells or beam-specific radio measurements carried out for at least two of the plurality of transmit beams. Here, the filtered results of the cell-specific or beam-specific radio measurements have been filtered at least by removing correlated results relating to at least one but not all of said at least two of the plurality of cells or transmit beams, as described above in connection with block 205.

Upon receiving the measurement report comprising the filtered results of cell-specific or beam-specific radio measurements and information on the correlation between cell-specific radio measurements carried out for at least two of the plurality of cells or beam-specific radio measurements carried out for at least two of the plurality of transmit beams, the access node (or the CU or DU thereof) may determine the results of cell/beam-specific measurements for all the plurality of cells or all the plurality of beams based on the filtered results and the information on the correlation. Obviously, the results of the cell/beam-specific measurements which are not explicitly included in the measurement report may only be determined approximately based on the information on the correlation and associated explicitly included results.

Figure 3:
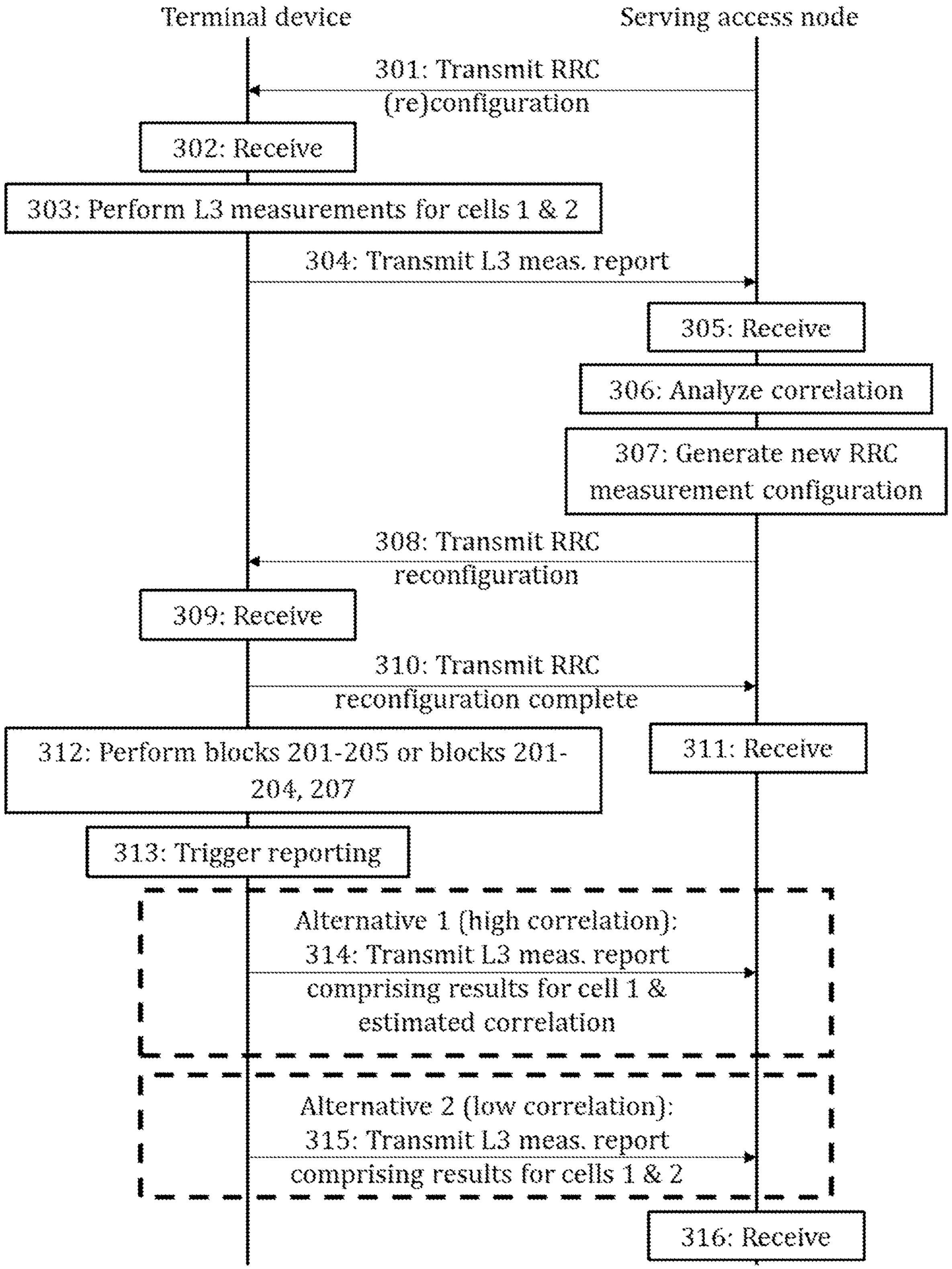
FIGS. 3 and 4 illustrate exemplary signaling between a terminal device and an access node in correlation-based L3 measurement reporting use case.

FIG. 3 illustrates signaling between a terminal device and its serving access node for efficient reporting of radio measurement results. FIG. 3 corresponds specifically to a correlation-based L3 measurement cell-level reporting use case where only a single correlation threshold has been configured for enabling/disabling the correlation-based reporting. The terminal device of FIG. 3 may correspond to either of the terminal devices 100, 102 of FIG. 1. The actions shown in FIG. 3 as being performed by the serving access node may be performed by a serving distributed unit of a distributed access node and/or by a central unit of the distributed access node (e.g., by the DU 104 of FIG. 1 and/or the CU 108 of FIG. 1).

In some embodiments, the actions shown in FIG. 3 as being performed by the serving access node may be performed by predominantly or even exclusively by a central unit of the distributed access node (e.g., the CU 108 of FIG. 1) with the distributed unit(s) of the distributed access node serving merely to forward messages between the terminal device and the central unit. Thus, the signaling between the terminal device and the central unit may be assumed to occur via a distributed unit (which may or may not be the same distributed unit for all messages of FIG. 3). In other embodiments (now shown in FIG. 3), the central unit of the distributed access node may command or request another device or node to perform the functionalities described in connection with one or more of blocks 306, 307.

Referring to FIG. 3, the serving access node initially transmits, in message 301, an RRC configuration (or RRC reconfiguration) message to the terminal device. The terminal device receives, in block 302, the RRC (re)configuration message.

The terminal device performs, in block 303, cell-level L3 measurements at least for a plurality of cells and transmits, in message 304, an associated L3 measurement report (comprising results of the cell-level L3 measurements) to the serving access node. In general, the plurality of cells may comprise a serving cell and/or one or more neighboring cells of the serving cell. In the example of FIG. 3, the plurality of cells comprise at least first and second cells (i.e., cells 1 & 2). The terminal device may measure and transmit to the serving access node, in elements 302, 303, at least RSRP (or RSRQ) values for the first and second cells. The serving access node receives, in block 305, the L3 measurement report.

The serving access node performs, in block 306, (cell-specific) correlation analysis based on the L3 measurement report (or in general, in multiple L3 measurement reports received from the terminal device) to detect correlation between measurements (e.g., RSRP or RSRQ measurements) from different cells. The serving access node may at least calculate, in block 306, correlations (or values of a correlation metric) between cell-specific RSRP or RSRQ values in the L3 measurement report. At least correlation between the first and second cells may be calculated. The correlation analysis of block 306 may be carried out in a similar manner as described for the correlation analysis of block 202 of FIG. 2.

The serving access node generates, in block 307, a new RRC measurement configuration for the terminal device based on the correlation analysis. Said new RRC measurement configuration comprises configuration information on one or more correlation conditions (e.g., a correlation threshold or first and second correlation thresholds) to be applied at the terminal device. Said new RRC measurement configuration may also comprise an (L3-based) correlation-based measurement reporting configuration. The (L3-based) correlation-based measurement reporting configuration defines how the terminal device should act when the one or more correlation conditions are satisfied or not satisfied at all (and if multiple correlation conditions are defined, how to act when some of the correlation conditions are satisfied).

In the example of FIG. 3, it is assumed that the serving access node calculates in block 307, a single correlation threshold L3CThr{i,j} for evaluating correlation between pairs of cells and an associated (L3-based) correlation-based measurement reporting configuration (defining what to report when the correlation threshold is met and not met). Here, i and j are cell indices (e.g., cell identifiers such as physical cell identifiers, PCIs, or beam identifiers). Thus, the correlation threshold L3CThr{i,j} may be defined differently for different cell pairs or to be the same for all cell pairs. The correlation threshold L3CThr{i,j} may be set, e.g., based on history information. To give an example, the correlation threshold may be calculated by taking the mean of the correlation coefficient after applying (1) or (2) over the history data (e.g., measurements received over some time). Alternatively, the correlation threshold may be a vendor specific parameter setting, similar to many other network specific parameter settings. The correlation threshold L3CThr{i,j} may be calculated, for example, as a mean value of the calculated correlation values.

The serving access node transmits, in message 308, an RRC reconfiguration message. The RRC reconfiguration message comprises the correlation threshold L3CThr{i,j}. The RRC reconfiguration message may also comprise the correlation-based measurement reporting configuration. The RRC reconfiguration message may also comprise information on an enablement trigger (i.e., the trigger for triggering transmission of an L3 measurement report). The terminal device receives, in block 309, the RRC reconfiguration message and transmits, in message 310, an RRC reconfiguration complete acknowledgement back to the serving access node. The terminal device may also store information contained in the RRC reconfiguration message to at least one memory. The serving access node receives, in block 311, the RRC reconfiguration complete message.

In some embodiments, elements 310, 311 may be omitted.

The terminal device performs, in block 312, the actions described previously in connection with blocks 202-205 of FIG. 2 or blocks 202-204, 207 of FIG. 2. Thus, the terminal device performs, in block 312, cell-level L3 measurements for a plurality of cells (at least for the first and second cells), similar to block 303. Moreover, the terminal device calculates, in block 312, a correlation (L3EstCorr{i,j}) between measurement results associated with different pairs of cells and compares the correlation value(s) against the configured correlation threshold (L3CThr{i,j}). Here, the L3EstCorr{i, j}) may be, for example, the correlation coefficient after applying the Pearson sample correlation equation (1) or (2) over the measurements (e.g., RSRP or RSRQ measurements) from cell i and cell j.

The terminal device monitors and detects, in block 313, a measurement reporting triggering event (e.g., an A3 event). As mentioned above, the triggering event may have been configured via the RRC reconfiguration message.

In response to the triggering in block 313, the terminal device performs, for each pair of cells for which measurements and correlation analysis were performed in block 312, one of two alternative transmissions 314, 315 depending on whether or not the pair of cells is sufficiently correlated. This operation may be based on the received RRC measurement configuration of the terminal device.

According to the first alternative, if the estimated correlation for cells i and j L3EstCorr{i,j} is equal to or larger than the correlation threshold L3CThr{i,j}, i.e., if L3EstCorr{i,j}≥L3CThr{i,j} holds, the cells i and j are considered to be highly correlated. Consequently, the terminal device transmits, in message 314, measurement results (e.g., RSRP or RSRQ measurements) only for one of the cells i and j in the next L3 measurement report. The L3 measurement report comprises also the estimated correlation L3EstCorr{i,j} for the cell pair {i,j} in this case.

According to the second alternative, if the estimated correlation for cells i and j L3EstCorr{i,j} is smaller than the correlation threshold L3CThr{i,j}, i.e., if L3EstCorr{i, j}<L3CThr{i,j} holds, the cells i and j are not considered to be highly correlated. Consequently, the terminal device transmits, in message 315, measurement results (e.g., RSRP or RSRQ measurements) for both of cells i and j as a part of the next L3 measurement report.

In some embodiments, the estimated correlation L3EstCorr{i,j} for the cell pair {i,j} may be included also in message 315.

It should be noted that FIG. 3 illustrates a simplistic case where only two cells (cells 1 & 2) are involved in the L3 measurements in blocks 303, 312. Consequently, the L3 measurement report 314/315 comprises information pertaining only to said cells 1 & 2. As described above, in general, the correlation determination is performed for all cell pairs for which L3 measurements are available and the transmitted L3 measurement report comprises information pertaining to all cell pairs. In other words, the L3 measurement report may, in practice, be a combination of multiple L3 measurement reports.

The serving access node receives, in block 316, one of the two alternative L3 measurement reports.

In some embodiments where the message 314 is transmitted, the serving access node (and/or some other network entity) may use reported measurements and the received estimated correlation information to perform local correlation verification or validation. In response to the verification or validation leading to a negative result (i.e., the verifying or validation is unsuccessful), the serving access node may repeat block 307 and the following steps shown in FIG. 3.

While the process of FIG. 3 was discussed above in terms of a correlation threshold, in more general embodiments, one or more correlation conditions may be configured by the RRC reconfiguration message 308 and employed in the terminal device, instead of the correlation threshold, similar to as discussed in connection with FIG. 2. In this more general case, the RRC reconfiguration message 308 may comprise a correlation-based measurement reporting configuration and/or information on the one or more pre-defined correlation conditions (or at least the latter). The correlation-based measurement reporting configuration information may comprise information on results to report when the one or more-predefined correlation conditions are satisfied for all pairs of cells and when the one or more-predefined correlation conditions are not satisfied for all pairs of cells. In some embodiments, said information on the results to report when the one or more-predefined correlation conditions are satisfied for all pairs of cells and when the one or more-predefined correlation conditions are not satisfied for all pairs of cells may be assumed to have been configured to the terminal device already previously.

Figure 4:
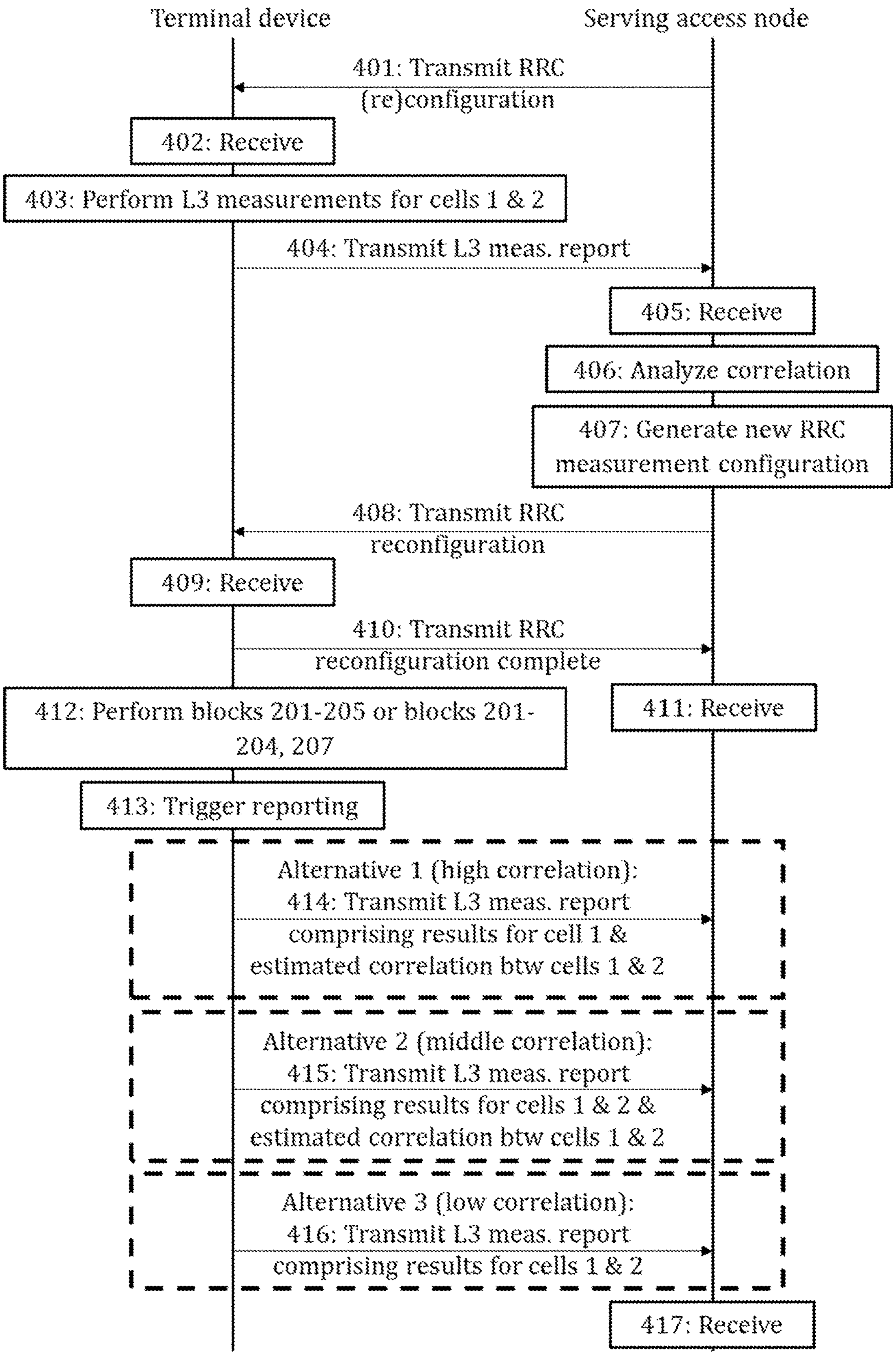

FIG. 4 illustrates alternative signaling between a terminal device and its serving access node for efficient reporting of radio measurement results. FIG. 4 corresponds specifically to a correlation-based L3 measurement cell-level reporting use case where two correlation thresholds (L3CThr_high{i, j} & L3CThr_low{i,j}) are configured for enabling/disabling the correlation-based reporting. The terminal device of FIG. 4 may correspond to either of the terminal devices 100, 102 of FIG. 1. The actions shown in FIG. 4 as being performed by the serving access node may be performed by a serving distributed unit of a distributed access node and/or by a central unit of the distributed access node (e.g., by the DU 104 of FIG. 1 and/or the CU 108 of FIG. 1).

Referring to FIG. 4, actions pertaining to elements 401 to 413 of FIG. 4 may correspond, mutatis mutandis, to actions described in connection with elements 301 to 313 of FIG. 3 and are thus not discussed in the following for brevity. However, it should be noted that the new RRC measurement configuration generated in block 407 comprises, in this case, first and second (or equally high and low) correlation thresholds (L3CThr_high {i,j} & L3CThr_low{i,j}), instead of only a single correlation threshold. Said first and second correlation thresholds may be defined separately for each pair of cells or commonly for all pairs of cells. Said first and second correlation thresholds may be defined so that L3CThr_low {i,j} <L3CThr_high{i,j} holds (for all values of i and j).

In response to the triggering in block 413, the terminal device performs, for each pair of cells for which measurements and correlation analysis were performed in block 412, one of three alternative transmissions 414 to 416 depending on whether or not the pair of cells is sufficiently correlated. This operation may be based on the received RRC measurement configuration of the terminal device.

According to the first alternative, if the estimated correlation for cells i and j L3EstCorr{i,j} is equal to or larger than the first correlation threshold L3CThr_high{i,j}, i.e., if L3EstCorr{i,j}≥L3CThr_high{i,j} holds, the cells i and j are considered to be highly correlated. Consequently, the terminal device transmits, in message 314, measurement results (e.g., RSRP or RSRQ measurements) only for one of the cells i and j in the next L3 measurement report. The L3 measurement report comprises also the estimated correlation L3EstCorr{i,j} for the cell pair {i,j} in this case. Thus, this case is similar to the one discussed in connection with message 314 of FIG. 3.

According to the second alternative, if the estimated correlation for cells i and j L3EstCorr{i,j} is smaller than the first correlation threshold L3CThr_high {i,j} but higher than or equal to the second correlation threshold L3CThr_low{i, j}, i.e., if L3CThr_low {i,j}≤L3EstCorr{i, j}<L3CThr_high{i,j} holds, the cells i and j are not considered to be highly correlated nor totally uncorrelated. In other words, it is uncertain whether or not the cells i and j could be considered correlated. Consequently, the terminal device transmits, in message 315, measurement results (e.g., RSRP or RSRQ measurements) for both of cells i and j as well as the estimated correlation L3EstCorr{i,j} for the cell pair {i,j} as a part of the next L3 measurement report. The estimated correlation L3EstCorr{i,j} may be used, for example, for subsequent network side verification and decision-making.

According to the third alternative, if the estimated correlation for cells i and j L3EstCorr{i,j} is smaller than the second correlation threshold L3CThr_low{i,j}, i.e., if L3EstCorr{i,j}<L3CThr_low{i,j}<L3CThr_high{i,j} holds, the cells i and j are not considered to be uncorrelated. Consequently, the terminal device transmits, in message 315, measurement results (e.g., RSRP or RSRQ measurements) for both of cells i and j as a part of the next L3 measurement report. The estimated correlation L3EstCorr{i, j} for the cell pair {i,j} may not be transmitted in this case.

The serving access node receives, in block 316, the L3 measurement report. Similar to as described in connection with FIG. 4, the serving access node (and/or some other network entity) may use reported measurements and the received estimated correlation information to perform local correlation verification or validation. In response to the verification or validation leading to a negative result (i.e., the verifying or validation is unsuccessful), the serving access node may repeat block 407 and the following steps shown in FIG. 4.

While the process of FIG. 4 was discussed above in terms of two different correlation thresholds, in more general embodiments, one or more first correlation conditions and one or more second correlation conditions may be configured by the RRC reconfiguration message 408 and employed in the terminal device, instead of the first and second correlation thresholds. Here, the one or more first correlation conditions may be defined to be more strict or stringent conditions (in terms of required degree of correlation) compared to the one or more second correlation conditions.

Figure 5:
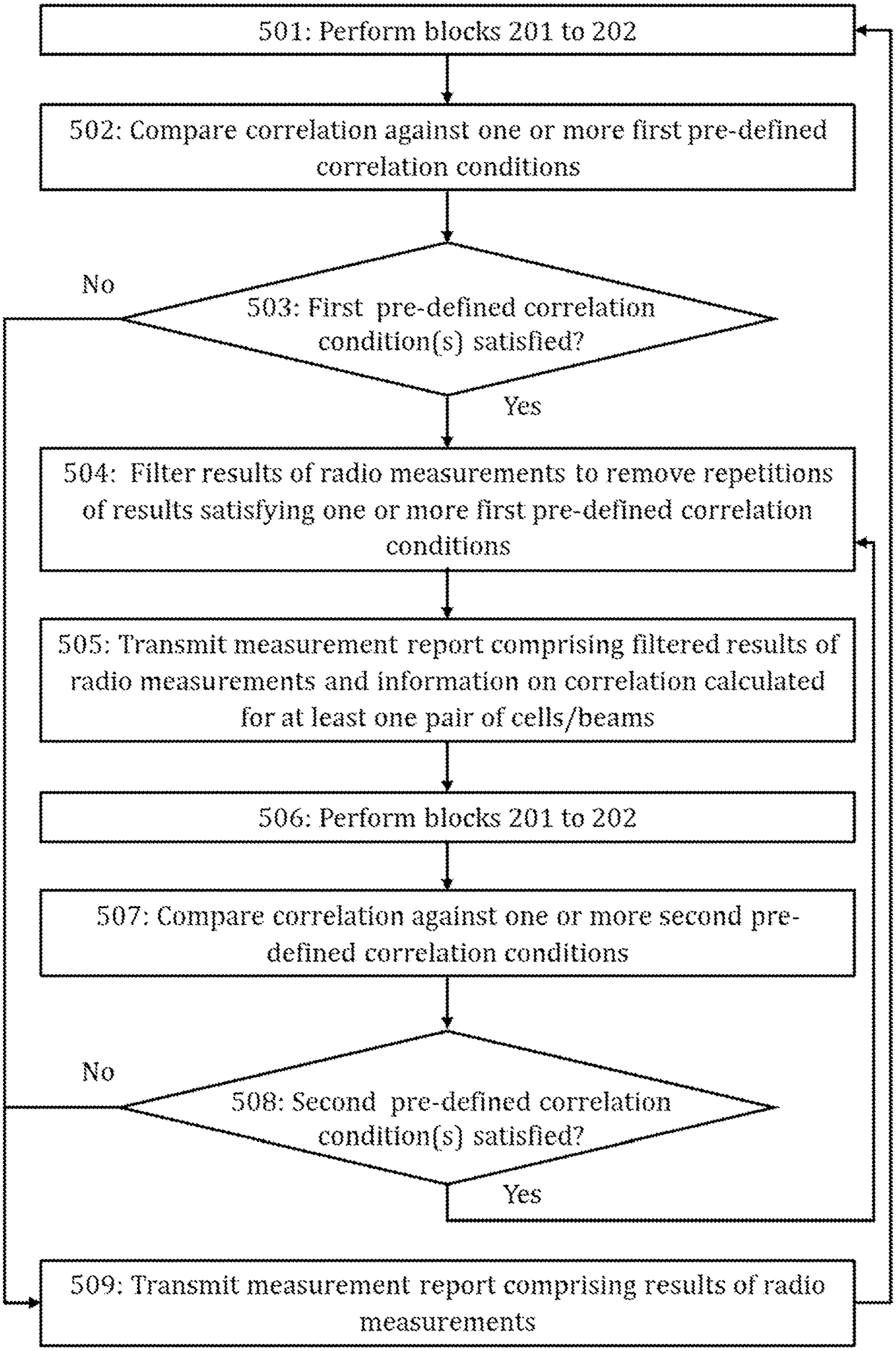
FIG. 5 illustrates an exemplary process according to embodiments.

FIG. 5 illustrate another process according to an embodiment for reporting measurement results in a manner which aims to reduce measurement reporting overhead. The illustrated process is performed by an apparatus which may be a terminal device or a part (e.g., a computing device) thereof. Said terminal device may correspond to either of the terminal devices 100, 102 of FIG. 1.

The process of FIG. 5 corresponds to a significant extent to the process of FIG. 2 though with some additional functionalities. The process of FIG. 5 starts with the terminal device performing, in block 501, actions described above in connection with blocks 201 to 202 of FIG. 2. Thus, in short, the terminal device performs radio measurements (e.g., L1/2 or L3 measurements) for a plurality of cells/transmit beams and evaluates correlation between results of the cell-specific or beam-specific radio measurements. Then, the terminal device compares, in block 202, the correlation between the different cell/transmit beam-specific results against one or more first pre-defined correlation conditions, similar to block 203 of FIG. 2 where the one or more pre-defined correlation conditions are applied. Here, the one or more first pre-defined correlation conditions are effectively conditions for enabling correlation-based measurement reporting, as will become evident in the following. The one or more first pre-defined correlation conditions may comprise (or consist of) a first correlation threshold (equally called a pre-defined correlation-based reporting enabling threshold). The one or more first pre-defined correlation conditions (or specifically the first correlation threshold) may be defined to be cell-pair-specific or beam-pair-specific (i.e., defined differently for different pairs of cells or pairs of transmit beams). In general, the one or more first pre-defined correlation conditions may be defined in a similar manner as described for the one or more pre-defined correlation conditions in connection with FIG. 2.

In response to the correlation for at least one pair of cells in the plurality of cells or for at least one pair of transmit beams in the plurality of transmit beams satisfying the one or more first pre-defined correlation conditions in block 503, the terminal device filters, in block 504, the results of the cell-specific or beam-specific radio measurements at least to remove repetitions of results satisfying the one or more pre-defined correlation conditions (i.e., repetitions of similar or correlated results) and transmits, in block 505, to an access node, a measurement report comprising the filtered results of the cell-specific or beam-specific radio measurements and information on the correlation calculated for the at least one pair of cells or transmit beams. The actions pertaining to blocks 504, 505 may correspond fully to actions described in connection with blocks 205, 206 of FIG. 2.

Then, the terminal device performs, in block 506, again the actions described above in connection with blocks 201 to 202 of FIG. 2. In other words, the terminal device repeats the (cell- or beam-specific) radio measurements and the associated correlation calculation.

The terminal device compares, in block 507, the correlation between the different cell-specific or beam-specific results against one or more second pre-defined correlation conditions, again similar to block 204 of FIG. 2. Here, the one or more second pre-defined correlation conditions are effectively conditions for disabling correlation-based measurement reporting, The one or more second pre-defined correlation conditions may comprise (or consist of) a second pre-defined correlation threshold (equally called a pre-defined correlation-based reporting disabling threshold). The one or more second pre-defined correlation conditions (or specifically the second correlation threshold) may be defined to be cell-pair-specific or beam-pair-specific (i.e., defined differently for different pairs of cells or pairs of transmit beams). The one or more second pre-defined correlation conditions may be defined to be less stringent compared to the one or more first pre-defined correlation conditions (e.g., a second pre-defined correlation threshold applied in block 507 may be defined to be lower than a first pre-defined correlation threshold applied in block 502). In other words, the requirements for enabling correlation-based measurement reporting are stricter (in terms of required correlation) than the requirements for disabling the correlation-based measurement reporting.

In response to the correlation (as calculated in block 506) for at least one pair of cells or for at least one pair of transmit beams satisfying the one or more second pre-defined correlation conditions in block 508, the terminal device repeats actions pertaining to blocks 504 to 508.

In response to the correlation (as calculated in block 506) for all pairs of cells or for all pairs of transmit beams failing to satisfy the one or more second pre-defined correlation conditions in block 508, the terminal device performs transmission of the results of the cell-specific or beam-specific radio measurements in a conventional non-correlation-based manner, similar to as discussed in connection with block 207 of FIG. 2. This is also done in response to the correlation for all pairs of cells/transmit beams failing to satisfy the one or more first pre-defined correlation conditions earlier in block 503.

Figure 6:
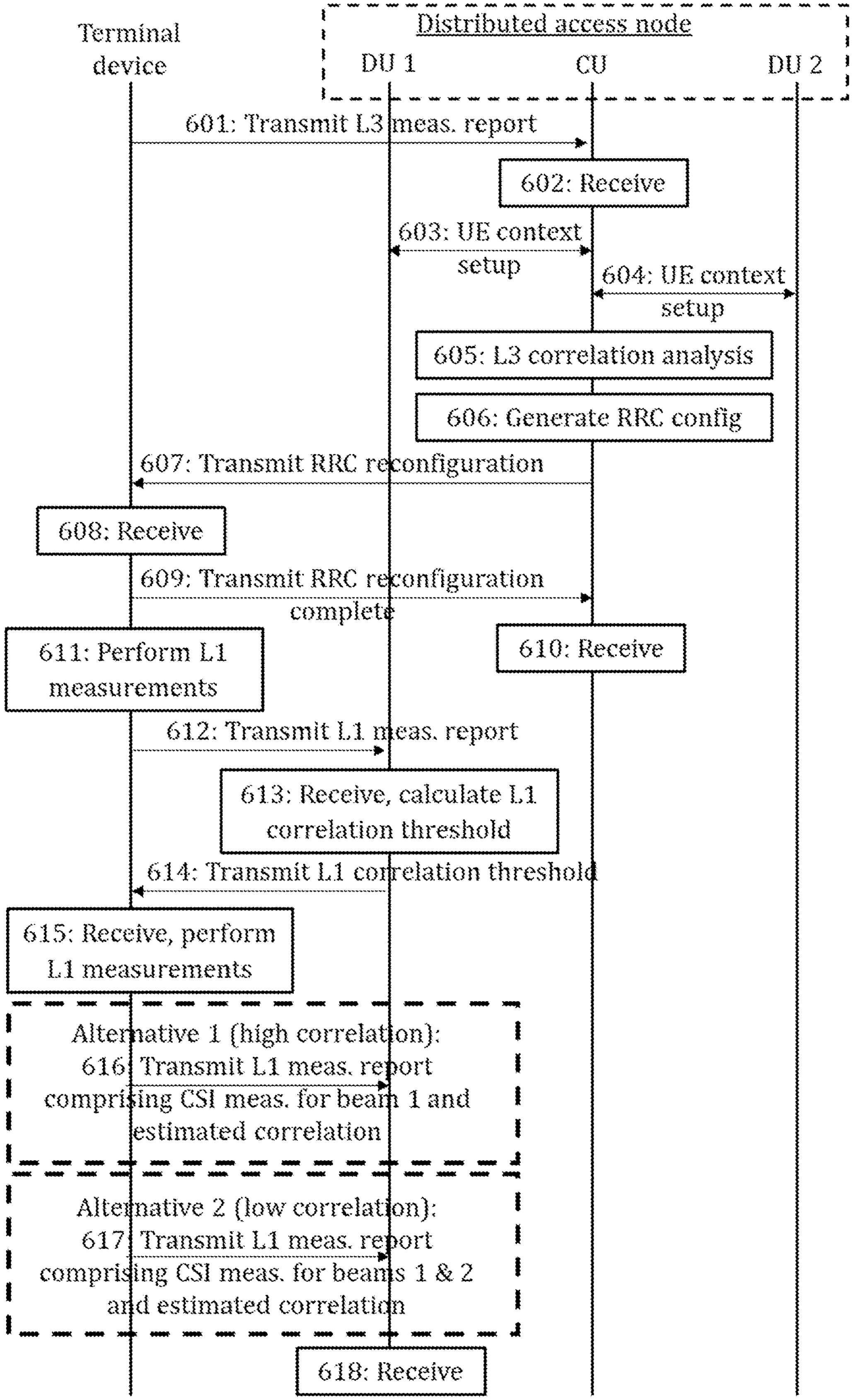
FIG. 6 illustrates exemplary signaling between a terminal device and two distributed units and a central unit of a distributed access node in a L1/2 intercell mobility use case.

FIG. 6 illustrates signaling between a terminal device, a central unit of distributed access node, a first distributed unit of the distributed access node and a second distributed unit of the distributed access node for enabling efficient reporting of radio measurement results. FIG. 6 corresponds specifically to a correlation-based L1 triggered mobility (i.e., L1/2 intercell mobility) use case where L1 measurements are collected and used as beam mobility triggers, instead of L3 measurements (as described in connection with FIGS. 3 and 4). The terminal device of FIG. 6 may correspond to either of the terminal devices 100, 102 of FIG. 1. The first and/or second distributed unit may correspond to the DU 104 of FIG. 1 and/or the central unit may correspond to the CU 108 of FIG. 1.

Referring to FIG. 6, it is initially assumed that the terminal device is in an RRC connected state and is being served by transmit beam(s) from the first distributed unit (i.e., the first distributed unit is the serving distributed unit for the terminal device). The second distributed unit provides a neighboring cell to the serving cell of the terminal devices. At least some of the transmit beams of the second distributed unit are receivable the terminal device. It should be noted that FIG. 6 corresponds to a simplified presentation where the messages transmitted from the terminal device via the first distributed unit to the central unit are shown simply as arrows connecting the terminal device and the central unit (i.e., the forwarding of the messages by the first distributed unit is not explicitly shown).

The process of FIG. 6 is initiated by the terminal device transmitting, in message 601, an L3 cell-level radio measurement report to the first distributed unit. The first distributed unit forwards, also in message 601, the L3 cell-level measurement report to the central unit. The L3 cell-level radio measurement report may have been generated earlier using conventional RRC Reconfiguration information sent by the central unit to the terminal device via the first distributed unit (not shown in FIG. 6).

Upon receiving the L3 cell-level radio measurement report in block 602, the central unit prepares, in messages 603, 604, the possible distributed units (first and second distributed units in this example) for providing a serving cell for the terminal device. Specifically, the central unit transmits, in messages 603, terminal device (UE) context setup request to the first distributed unit. Upon receiving the UE context setup request, the first distributed unit transmits, also in messages 603, a terminal device context setup response back to the central unit. Similarly, the central unit transmits, in messages 604, an UE context setup request to the second distributed unit. The second distributed unit, in turn, transmits, also in messages 604, a terminal device context setup response back to the central unit.

The central unit performs, in block 605, correlation estimation calculation(s) based on the L3 cell-level radio measurement report.

The central unit generates, in block 606, an RRC configuration for enabling L1 triggered mobility and for enabling L1 correlation-based radio measurement reporting based on the L3 cell-level (or cell-specific) correlation estimation.

The actions relating block 605 and L3-based correlation related functionalities of block 606 may be considered optional.

The central unit transmits, in message 607, an RRC reconfiguration message comprising the generated RRC configuration for enabling the L1 triggered mobility and the L1 correlation-based radio measurement reporting (based on L3 cell-level correlation estimation) via the first distributed unit to the terminal device. Said RRC configuration message may also comprise information on the cells prepared for the L1 triggered mobility (here, cells provided by the first and second distributed units). The terminal device receives the RRC reconfiguration message in block 608.

The terminal device transmits, in message 609, an RRC reconfiguration complete message back to the central unit via the first distributed unit so as to acknowledge the successful reception of the new RRC configuration. The central unit receives, in block 610, the RRC reconfiguration complete message. In some embodiments, elements 609, 610 may be omitted.

The terminal device performs, in block 611, initial L1 beam-level (i.e., beam-specific) radio measurements (e.g., CSI measurements). It is assumed in this particular example that the L1 beam-level radio measurements comprise at least measurements of one or more transmit beams of the first distributed unit and of one or more transmit beams of the second distributed unit. In some embodiments, the terminal device may also calculate an L1 correlation estimate (L1EstCorr) based on the results of the L1 beam-level radio measurements. The L1 correlation estimate may be used for helping the network (here, specifically the first distributed unit) in setting the correlation-based L1 measurement reporting threshold (L1CThr).

The terminal device transmits, in message 612, a measurement report comprising the results of the L1 beam-level radio measurements (and optionally the L1 correlation estimate L1EstCorr, if calculated) to the first distributed unit. The first distributed unit receives, in block 613, the results of the L1 beam-level radio measurements (and optionally the L1 correlation estimate L1EstCorr).

The first distributed unit calculates, in block 613, correlation between results of L1 beam-level radio measurements for different pairs of transmit beams provided by (at least) the first and second distributed units. Based on the calculated correlation (i.e., correlation values), the first distributed unit calculates, in block 613, a correlation-based L1 measurement reporting threshold L1CThr (or simply a L1 correlation threshold). Here, the calculated correlation may correspond to values of a correlation metric calculated for different pairs of transmit beams. The correlation metric may be any correlation metric as mentioned in connection with FIG. 2. The correlation-based L1 measurement reporting threshold L1CThr may be calculated, for example, as a mean value of the calculated correlation values.

In some embodiments, the correlation-based L1 measurement reporting threshold L1CThr may be defined beam-pair-specifically (i.e., it may have a different value for different pairs of transmit beams).

The first distributed unit transmits, in message 614, the calculated correlation-based L1 measurement reporting threshold (L1CThr) to the terminal device. The terminal device receives, in block 615, the calculated correlation-based L1 measurement reporting threshold.

The terminal device performs, in block 615, further L1 beam-level radio measurements (e.g., CSI measurements). The further L1 beam-level radio measurements may be measurements of one or more transmit beams of the first distributed unit and/or of one or more transmit beams of the second distributed unit. The terminal device calculates, also in block 615, a correlation between measurements results for pairs of measured transmit beams (L1EstCorr per beam pair). Moreover, the terminal device compares, in block 615, the correlation between results of pairs of measured transmit beams against the correlation-based L1 measurement reporting threshold (i.e., L1EstCorr per transmit beam pair against the L1CThr received from the first distributed unit).

The terminal device performs, for each pair of transmit beams for which measurements and correlation analysis were performed in block 615, one of two alternative transmissions 616, 617 depending on whether or not the pair of transmit beams is sufficiently correlated.

According to the first alternative, if the estimated correlation EstCorr for two transmit beams (e.g., 2 transmit beams of the first distributed unit, 2 transmit beams of the second distributed unit or 1 transmit beam of the first distributed unit and 1 transmit beam of the second distributed unit) is equal to or larger than the correlation-based L1 measurement reporting threshold L1CThr, i.e., if $EstCorr \geq L1CThr$ holds, the two transmit beams are considered to be highly correlated. Consequently, the terminal device transmits, in message 616, results of the further L1 beam-level radio measurements (e.g., CSI measurement) only for one of the two transmit beams in the next L1 measurement report to the first distributed unit. The L1 measurement report comprises also the estimated correlation EstCorr for the beam pair in this case. Thus, this case is somewhat analogous with the one discussed in connection with message 314 of FIG. 3 or message 414 of FIG. 4 (though obviously the measurements and correlation analysis are here beam-specific, as opposed to only cell-specific).

According to the second alternative, if the estimated correlation EstCorr for two transmit beams (e.g., 2 transmit beams of the first distributed unit, 2 transmit beams of the second distributed unit or 1 transmit beam of the first distributed unit and 1 beam of the second distributed unit) is smaller than the correlation-based L1 measurement reporting threshold L1CThr, i.e., if EstCorr<L1CThr holds, the two transmit beams are considered not to be highly correlated. Consequently, the terminal device transmits, in message 617, results of the further L1 beam-level radio measurements (e.g., CSI measurement) for both of the two transmit beams in the next L1 measurement report to the first distributed unit. The L1 measurement report may optionally also comprise the estimated correlation EstCorr for the transmit beam pair. Thus, this case is somewhat analogous with the one discussed in connection with message 415 of FIG. 4 (though obviously the measurements and correlation analysis are here beam-specific, as opposed to only cell-specific).

The first distributed unit receives, in block 618, the L1 measurement report defined according to one of the two alternatives.

While the process of FIG. 6 was discussed above in terms of a single L1 correlation threshold, in more general embodiments, one or more correlation conditions may be configured in elements 613 to 615 and employed in the terminal device, instead of the correlation threshold, similar to as discussed in connection with FIG. 2. Also, in some embodiments, first and second L1 correlation threshold may be defined, instead of a single L1 correlation threshold, in an analogous manner with the process of FIG. 4 (where first and second L3 correlation thresholds are defined).

In some embodiments, the first distributed unit may optionally carry out local estimation of correlation and verify that the terminal device-side estimate and/or decision is correct. If the decision is determined not to be correct, the first distributed unit may, for example, transmit to the terminal device additional correlation configuration information or tuning rules for better future correlation estimation.

In some embodiments, the network (i.e., the first distributed unit or the central unit of the distributed access node) may aggregate (or collect) L1 or L3 measurement reports from a plurality of terminal devices (i.e., a specific cluster), as opposed relying only on L1 or L3 measurements carrying out by a single terminal device. The aggregated measurement data pertaining to a plurality of terminal device may be used for estimating measurement correlation in a more accurate manner. This estimated measurement correlation may be then used for setting the L1CThr (by the first distributed unit) and/or L3CThr (by the central unit).

In some embodiments, the terminal device may derive its own local correlation threshold and compare it against the global (network-side) correlation threshold (L1CThr). The global threshold may be defined, e.g., as an average over larger amount of measurements (historical data) collected by the network (e.g., by a particular distributed unit and/or by the central unit) over time. The global threshold may be broadcasted, on cell-level, by the access node (e.g., by a particular distributed unit).

Many of the embodiments discussed above involve selection or defining of a correlation threshold such as L3CThr{i, j} in block 307, L3CThr_high {i,j} & L3CThr_low {i,j} in block 407 and L1CThr{i,j} in block 613 (where i and j are indices for different cells or beams). Any of these correlation thresholds may be either:

a) a global correlation threshold (i.e., a threshold to be applied to all the features) or
b) a local correlation threshold (i.e., different thresholds are set for different features).

The term "feature" as used herein may refer to any variable of interest for which we have some observations (i.e., measurements). In other words, a feature may be a quantitative attribute or characteristic that is being extracted from the (raw) measurements or which corresponds to directly to results of the (raw) measurement in their original form or aggregation of several results of (raw) measurements. In this context, features may be specifically RSRP (or RSRQ) values of different cells.

Both global and local thresholds may be set either manually or dynamically. In manual setting, a vendor-specific fixed value may be proposed based on local trial-and-error determination. The network may also suggest a value from a list of thresholds based on terminal device capability (global).

Several alternative approaches may be employed for selecting the correlation threshold value dynamically or adaptively, for example, depending on the computational resources available and other execution indicators:

a) Threshold selection based on a statistical significance testing, e.g., t-test. When the sample correlation is computed, a correlation t-test can simply be used to determine whether the resulting correlation is significant (for instance with p-value=0.05).
b) Computing the correlation between each input feature/variable of a machine-learning model with the target variable (i.e., an output of the machine-learning model) and then selecting the Worst-1 or Worst-K values as the correlation threshold. Here, "Worst-1" refers to the least acceptable value for correlation between a pair of cells or beams, and "Worst-K" refers to the Kth least acceptable value (i.e., Kth worst value) for correlation between a pair of cells or beams. The value of K (being a positive integer) may be preconfigured or determined by the network.
c) The selection of first and second thresholds (i.e., upper and lower threshold) as described in connection with FIG. 4 may be based on, for example, manifold learning/entropy based analysis or sequential backward feature selection.
d) Using ranking-based or feature importance-based methods to find out Top-1/Top-K features, and to select the score (i.e., the output of the particular ranking-based or feature importance-based method) as the default correlation threshold.
e) Heuristic threshold selection, in which a relatively high value is set as the threshold, and if the desired outcome is not achieved, the threshold value is modified accordingly.

In dynamic selection, the network (i.e., an access node or a central unit or a distributed unit of a distributed access node depending on the embodiment) may apply any of the above selection methods on the collective measurements either periodically or event-triggered (global/vendor agnostic) or may use the value suggested by vendor-specific UE (local).

The blocks, related functions, and information exchanges (messages) described above by means of FIGS. 2 to 6 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 7:
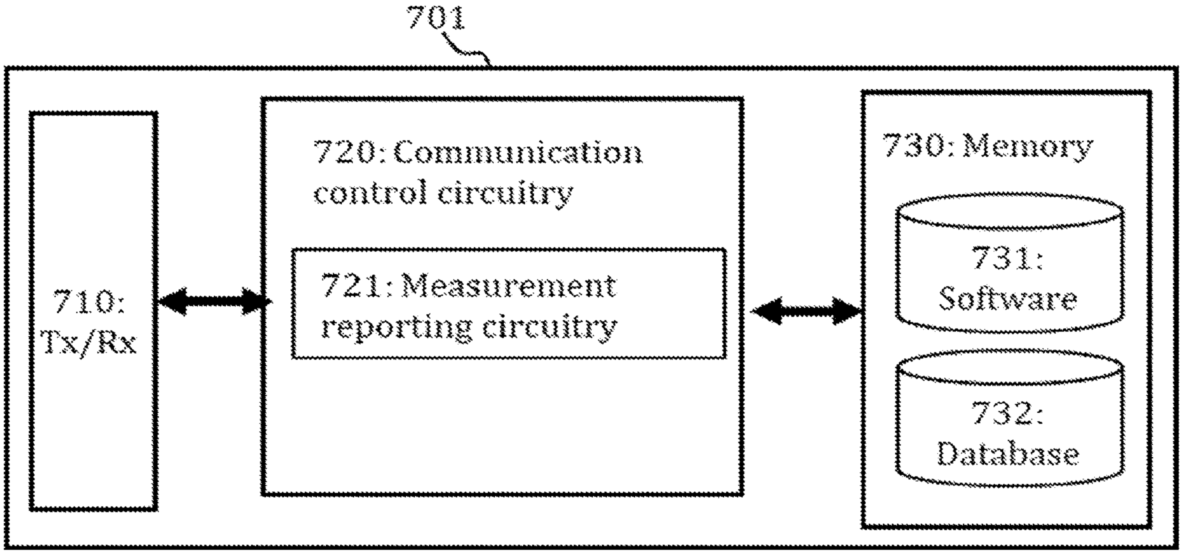
FIG. 7 illustrates an apparatus according to embodiments.

FIG. 7 provides an apparatus 701 according to some embodiments. Specifically, FIG. 7 may illustrate an apparatus 701 configured to carry out at least some of the functions described above in connection with performing measurement reporting in an efficient manner. The apparatus may be or form a part of a terminal device, a distributed unit of a distributed access node, a central unit of a distributed access node or a non-distributed access node.

The apparatus 701 may comprise one or more control circuitry 720, such as at least one processor, and/or at least one memory 730, including one or more algorithms 731, such as a computer program code (software) wherein the at least one memory and the computer program code (software) are configured, with the at least one processor, to cause the apparatus 701 to carry out any one of the exemplified functionalities of the terminal device, the distributed unit of an access node, a central unit of an access node or the access node. Said at least one memory 730 may also comprise at least one database 732.

Referring to FIG. 7, the one or more communication control circuitry 720 of the apparatus 701 comprise at least measurement reporting circuitry 721 which is configured to perform the measurement reporting (and/or measurement reporting configuration) functionalities according to embodiments. The measurement reporting circuitry 721 may be configured to perform functionalities described in connection with the terminal device, the access node, the (first and/or second) distributed unit or the central unit described above, e.g., by means of any of elements of any of FIGS. 2 to 6, using one or more individual circuitries.

Referring to FIG. 7, the memory 730 may be implemented using any suitable data storage technology, such as semiconductor based memory devices, flash memory, magnetic memory devices and systems, optical memory devices and systems, fixed memory and removable memory.

Referring to FIG. 7, the apparatus 701 may further comprise different interfaces 710 such as one or more communication interfaces (TX/RX) comprising hardware and/or software for realizing communication connectivity according to one or more communication protocols. Specifically, the one or more communication interfaces 710 may comprise, for example, interfaces providing a connection to the Internet and a core network of a wireless communications network. The one or more communication interface 710 may provide the apparatus with communication capabilities to communicate in a cellular communication system and enable communication with user devices (terminal devices) and different network nodes or elements (e.g., distributed and/or central units of access nodes) and/or a communication interface to enable communication between different network nodes or elements, for example. The one or more communication interfaces 710 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 6 may be carried out by an apparatus comprising corresponding means for carrying out at least some of the described processes. Some example means for carrying out the processes may include at least one of the following: detector, processor (including dual-core and multiple-core processors), digital signal processor, controller, (radio) receiver, (radio) transmitter, (radio) transceiver, encoder, decoder, memory, RAM, ROM, software, firmware, display, user interface, display circuitry, user interface circuitry, user interface software, display software, circuit, antenna, antenna circuitry, and circuitry. In some embodiments, said means comprise at least at least one processor and a (radio) transceiver.

In some embodiment, the at least one processor, the memory, and the computer program code form processing means or comprises one or more computer program code portions for carrying out one or more operations according to any one of the embodiments of 2 to 6 or operations thereof.

According to an embodiment, there is provided an apparatus (e.g., a terminal device or a part thereof) comprising means for performing:

- performing cell-specific radio measurements for a plurality of cells or beam-specific radio measurements for a plurality of transmit beams;
- evaluating correlation between results of the cell-specific or beam-specific radio measurements;
- comparing the correlation against one or more pre-defined correlation conditions; and
- in response to the correlation for at least one pair of cells in the plurality of cells or for at least one pair of transmit beams in the plurality of transmit beams satisfying the one or more pre-defined correlation conditions,
  - filtering the results of the cell-specific or beam-specific radio measurements at least to remove repetitions of results satisfying the one or more pre-defined correlation conditions and
  - transmitting, to another apparatus, a measurement report comprising the filtered results of the cell-specific or beam-specific radio measurements and information on the correlation calculated for the at least one pair of cells or transmit beams.

According to an embodiment, there is provided an apparatus (e.g., a central unit of an access node or a part thereof or a distributed unit of an access node or a part thereof) comprising means for performing:

- receiving, from a terminal device, a measurement report comprising filtered results of cell-specific or beam-specific radio measurements carried out by the terminal device for a plurality of cells or for a plurality of transmit beams, respectively, and information on a correlation between cell-specific radio measurements carried out for at least two of the plurality of cells or beam-specific radio measurements carried out for at least two of the plurality of transmit beams, wherein the filtered results of the cell-specific or beam-specific radio measurements have been filtered at least by removing correlated results relating to at least one but not all of the at least two of the plurality of cells or transmit beams.

Embodiments as described may also be carried out in the form of a computer process defined by a computer program or portions thereof. Embodiments of the methods described in connection with FIGS. 2 to 6 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

The term "non-transitory," as used herein, is a limitation of the medium itself (i.e., tangible, not a signal) as opposed to a limitation on data storage persistency (e.g., RAM vs. ROM).

Figure 8:
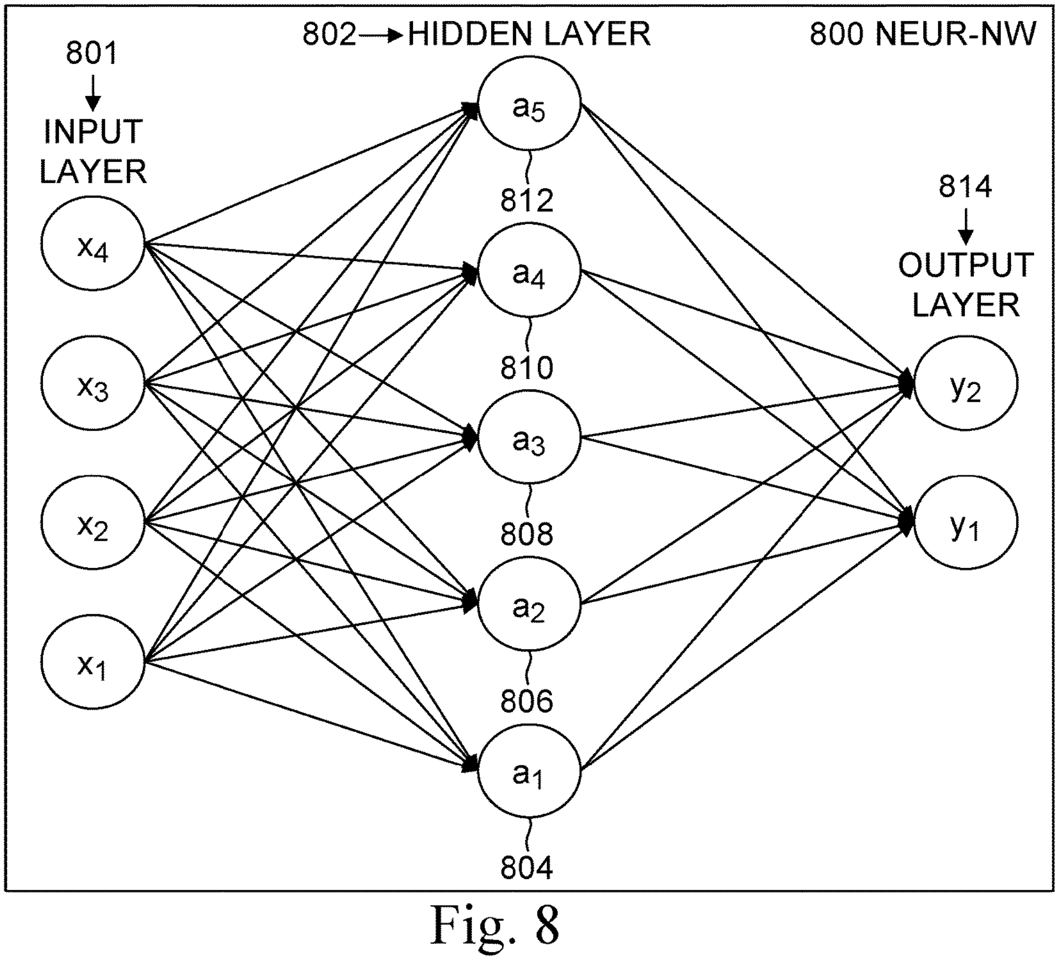
FIG. 8 illustrates a neural network according to an embodiment.
Figure 9:
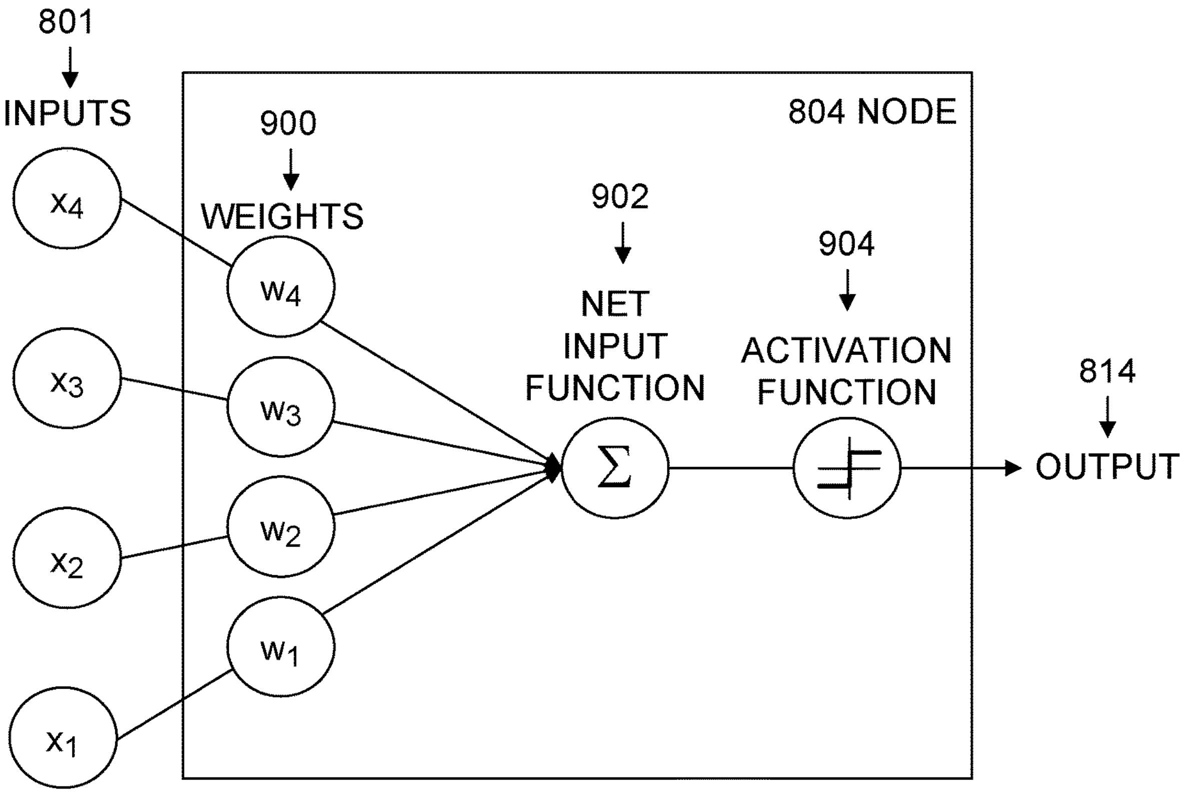
FIG. 9 illustrates a computational node a neural network according to an embodiment.

FIG. 8 illustrates an embodiment of the neural network 800 with one hidden layer, and FIG. 9 illustrates an embodiment of a computational node 804 of said neural network 800. As described above, at least some of the embodiments may involve one or more machine-learning models. Any of the machine-learning models as described above in connection with any of FIGS. 2 to 6 may be defined as will be described in connection with FIGS. 8 and 9 below.

Deep learning (also known as deep structured learning or hierarchical learning) is part of a broader family of machine learning methods based on the layers used in artificial neural networks.

An artificial neural network (ANN) 800 comprises a set of rules that are designed to execute tasks such as regression, classification, clustering, and pattern recognition. The ANNs achieve such objectives with a learning procedure, where they are shown various examples of input data, along with the desired output. With this, they learn to identify the proper output for any input within the training data manifold. Learning by using labels is called supervised learning and learning without labels is called unsupervised learning. Deep learning typically requires a large amount of input data.

A deep neural network (DNN) 800 is an artificial neural network comprising multiple hidden layers 802 between the input layer 801 and the output layer 814. Training of DNN allows it to find the correct mathematical manipulation to transform the input into the proper output even when the relationship is highly non-linear and/or complicated.

Each hidden layer 802 comprise nodes 804, 806, 808, 810, 812, where the computation takes place. As shown in FIG. 9, each node 804 combines input data 801 with a set of coefficients, or weights 900, that either amplify or dampen that input 801, thereby assigning significance to inputs 801 with regard to the task the algorithm is trying to learn. The input-weight products are added 902 and the sum is passed through an activation function 904, to determine whether and to what extent that signal should progress further through the network 800 to affect the ultimate outcome, such as an act of classification. In the process, the neural networks learn to recognize correlations between certain relevant features and optimal results.

In the case of classification, the output of deep-learning network 800 may be considered as a likelihood of a particular outcome, such as in this case a probability of decoding success of a data packet. In this case, the number of layers 802 may vary proportional to the number of used input data 801. However, when the number of input data 801 is high, the accuracy of the outcome 814 is more reliable. On the other hand, when there are fewer layers 802, the computation might take less time and thereby reduce the latency. However, this highly depends on the specific DNN architecture and/or the computational resources.

Initial weights 900 of the model can be set in various alternative ways. During the training phase they are adapted to improve the accuracy of the process based on analyzing errors in decision making. Training a model is basically a trial and error activity. In principle, each node 804, 806, 808, 810, 812 of the neural network 800 makes a decision (input*weight) and then compares this decision to collected data to find out the difference to the collected data. In other words, it determines the error, based on which the weights 900 are adjusted. Thus, the training of the model may be considered a corrective feedback loop.

Typically, a neural network model is trained using a stochastic gradient descent optimization algorithm for which the gradients are calculated using the backpropagation algorithm. The gradient descent algorithm seeks to change the weights 900 so that the next evaluation reduces the error, meaning the optimization algorithm is navigating down the gradient (or slope) of error. It is also possible to use any other suitable optimization algorithm if it provides sufficiently accurate weights 900. Consequently, the trained parameters of the neural network 800 may comprise the weights 900.

In the context of an optimization algorithm, the function used to evaluate a candidate solution (i.e. a set of weights) is referred to as the objective function. Typically, with neural networks, where the target is to minimize the error, the objective function is often referred to as a cost function or a loss function. In adjusting weights 900, any suitable method may be used as a loss function, some examples are mean squared error (MSE), maximum likelihood (MLE), and cross entropy.

As for the activation function 904 of the node 804, it defines the output 814 of that node 804 given an input or set of inputs 801. The node 804 calculates a weighted sum of inputs, perhaps adds a bias and then makes a decision as "activate" or "not activate" based on a decision threshold as a binary activation or using an activation function 904 that gives a nonlinear decision function. Any suitable activation function 904 may be used, for example sigmoid, rectified linear unit (ReLU), normalized exponential function (softmax), softplus, tanh, etc. In deep learning, the activation function 904 is usually set at the layer level and applies to all neurons in that layer. The output 814 is then used as input for the next node and so on until a desired solution to the original problem is found.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:

at least one processor; and at least one memory including computer program code, the at least one memory and computer program code configured to, with the at least one processor, cause the apparatus to perform:

performing cell-specific radio measurements for a plurality of cells or beam-specific radio measurements for a plurality of transmit beams;

evaluating correlation between results of the cell-specific radio measurements or the beam-specific radio measurements;

comparing the correlation against one or more pre-defined correlation conditions, wherein the one or more pre-defined correlation conditions comprise a first pre-defined correlation threshold and a second pre-defined correlation threshold being lower than the first pre-defined correlation threshold;

in response to the correlation for at least one pair of cells in the plurality of cells or for at least one pair of transmit beams in the plurality of transmit beams satisfying the one or more pre-defined correlation conditions:

filtering the results of the cell-specific radio measurements or the beam-specific radio measurements at least to remove repetitions of results satisfying the one or more pre-defined correlation conditions, transmitting, to another apparatus, a measurement report comprising the filtered results of the cell-specific radio measurements or the beam-specific radio measurements and information on the correlation calculated for the at least one pair of cells or transmit beams; and in response to the correlation between the at least one pair of cells in the plurality of cells or between the at least one pair of beams in the plurality of transmit beams being smaller than the first pre-defined correlation threshold but larger than or equal to the second pre-defined correlation threshold, transmitting, to the another apparatus, a measurement report comprising the results of the cell-specific radio measurements or the beam-specific radio measurements for the at least one pair of cells or beams and information on the correlation calculated for the at least one pair of cells or beams.

2. The apparatus of claim 1, wherein the at least one memory and the computer program code are configured, with the at least one processor, to cause the apparatus to perform:

in response to the correlation between all pairs of cells in the plurality of cells or all pairs of transmit beams in the plurality of transmit beams failing to satisfy the one or more pre-defined correlation conditions, transmitting a measurement report comprising the results of the radio measurements without filtering to said another apparatus; or in response to the correlation between all pairs of cells in the plurality of cells or all pairs of transmit beams in the plurality of transmit beams failing to satisfy the one or more pre-defined correlation conditions, transmitting a measurement report comprising the results of the radio measurements without filtering and information on the correlation calculated for all pairs of cells in plurality of cells or all pairs of beams in the plurality of transmit beams to said another apparatus.

3. The apparatus of claim 1, wherein the one or more pre-defined correlation conditions are one or more first pre-defined correlation conditions and the at least one memory and the computer program code are configured, with the at least one processor, to cause the apparatus to, following the transmitting:

repeat the performing of the cell-specific radio measurements or the beam-specific radio measurements, the evaluating or the causing of the evaluation, the comparing, the filtering and the transmitting until the correlation for all pairs of cells in the plurality of cells or for all pairs of beams in the plurality of transmit beams fail to satisfy one or more second pre-defined correlation conditions, the one or more second pre-defined correlation conditions being less stringent compared to the one or more first pre-defined correlation conditions.

4. The apparatus according to claim 1, wherein the one or more pre-defined correlation conditions comprise a pre-defined correlation threshold.

5. The apparatus according to claim 1, wherein the at least one memory and the computer program code are configured, with the at least one processor, to cause the apparatus to perform:

maintaining, in the at least one memory, a trained machine-learning algorithm for evaluating correlation between results of cell-specific radio measurements or the beam-specific radio measurements; and performing the evaluating of the correlation using the trained machine-learning algorithm.

6. The apparatus according to claim 1, wherein the results of cell-specific radio measurements or the beam-specific radio measurements for each of the plurality of cells or beams comprise at least one of:

one or more values of reference signal received power, one or more values of reference signal received quality, or one or more values of channel state information.

7. The apparatus according to claim 1, wherein the at least one memory and the computer program code are configured, with the at least one processor, to cause the apparatus to perform the evaluation of the correlation by:

calculating values of a correlation metric between the results of the cell-specific radio measurements or the beam-specific radio measurements, wherein the correlation metric is or is based on at least one of: Pearson sample correlation coefficient, a Spearman's rank correlation coefficient, a Mann Whitney U test, a Wilcoxon test, a Kruskal-Wallis test, a Friedman test, a Dice's coefficient, a Tanimoto Distance, a Jaccard Index or a Kuncheva Index.

8. The apparatus according to claim 7, wherein the information on the correlation calculated for the at least one pair of cells or transmit beams transmitted to said another apparatus comprises at least one value of the correlation metric.

9. The apparatus according to claim 1, wherein the at least one memory and the computer program code are configured, with the at least one processor, to cause the apparatus to perform the cell-specific radio measurements, the cell-specific radio measurements being cell-specific layer-3 radio measurements and said another apparatus is an access node.

10. The apparatus of claim 9, wherein the at least one memory and the computer program code are configured, with the at least one processor, to cause the apparatus to perform, before the performing of the cell-specific layer-3 radio measurements:

receiving a radio resource control (RRC) reconfiguration message from the access node, wherein the RRC reconfiguration message comprises at least information on the one or more pre-defined correlation conditions.

11. The apparatus of claim 10, wherein the at least one memory and the computer program code are configured, with the at least one processor, to cause the apparatus to perform, before the receiving of the RRC reconfiguration message:

performing initial cell-specific layer-3 radio measurements for a plurality of cells; and transmitting, to the access node, a measurement report comprising the results of the initial cell-specific layer-3 radio measurements.

12. The apparatus according to claim 1, wherein the at least one memory and the computer program code are configured, with the at least one processor, to cause the apparatus to perform the beam-specific radio measurements, the beam-specific radio measurements being beam-specific layer-1 radio measurements and said another apparatus is an access node.

13. The apparatus of claim 12, wherein the at least one memory and the computer program code are configured, with the at least one processor, to cause the apparatus to perform, before the performing of the beam-specific layer-1 radio measurements:

performing initial beam-specific layer-1 radio measurements for a plurality of transmit beams;

transmitting, to a distributed unit of the access node, a measurement report comprising the results of the initial beam-specific layer-1 radio measurements; and receiving, from the distributed unit of the access node, the one or more pre-defined conditions.

14. The apparatus according to claim 1, wherein the one or more pre-defined correlation conditions are defined cell-pair-specifically or beam-pair-specifically.

* * * * *